US005993903A

United States Patent [19]
Toepfer et al.

[11] Patent Number: 5,993,903
[45] Date of Patent: Nov. 30, 1999

[54] APPARATUS AND METHOD FOR TREATING SEED

[75] Inventors: Randal Wade Toepfer; Michael Glenn Redlich, both of Eunice, La.; James Daniel Fish, Jr., Raleigh, N.C.

[73] Assignee: Toepfer's Manufacturing and Distributing Co., Inc., Eunice, La.

[21] Appl. No.: 08/829,878

[22] Filed: Apr. 2, 1997

Related U.S. Application Data

[63] Continuation-in-part of application No. 08/727,006, Oct. 8, 1996.
[51] Int. Cl.$^6$ .............................. B05D 3/12; B05B 17/00
[52] U.S. Cl. ......................... 427/242; 427/212; 427/421; 118/303
[58] Field of Search ............................. 118/19, 303, 712, 118/668; 427/212, 242, 421; 99/516, 534; 426/302, 305, 507, 519; 414/503–505

[56] References Cited

U.S. PATENT DOCUMENTS

| 477,909 | 6/1892 | Meier et al. | 118/303 |
|---|---|---|---|
| 1,914,342 | 6/1933 | Larsen | 118/303 |
| 2,071,846 | 2/1937 | Lamb et al. | 118/303 |
| 2,862,511 | 3/1958 | Forsberg | 118/303 |
| 3,213,867 | 10/1965 | McIntyre | 118/303 |
| 4,275,682 | 6/1981 | Weber | 118/303 |
| 4,503,803 | 3/1985 | Barnes | 118/303 |
| 4,596,206 | 6/1986 | Berge et al. | 118/303 |
| 4,895,106 | 1/1990 | Barnes | 118/303 |
| 5,488,898 | 2/1996 | Hough | 118/303 |

FOREIGN PATENT DOCUMENTS

| 2856763 | 7/1979 | Germany | 118/303 |
|---|---|---|---|
| 55-4457 | 1/1980 | Japan | 118/303 |
| 725595 | 4/1980 | Russian Federation | 118/303 |

*Primary Examiner*—David A. Simmons
*Assistant Examiner*—Calvin Padgett
*Attorney, Agent, or Firm*—Bacon & Thomas, PLLC

[57] ABSTRACT

A seed treating apparatus includes a housing having at least three, vertically spaced alternating converging and diverging conical members therein and a plurality of sprayer units arranged to coat the seed flowing through the housing with liquid seed treating agent. A first, converging upper conical member guides the seed into an upper, open end of the housing. A second diverging conical member is located below the first conical member and can be vertically moved to adjust the rate at which the seed leaves the first conical member. A first set of spraying units is arranged about the inner periphery of the housing and is preferably aimed toward the second conical member for spraying the seed as it flows towards and over the second conical member. The seed then is caused to flow toward a third converging conical member which guides the seed to a lower open end of the housing. A second set of spraying units is provided between the second and third conical members for additional spraying of the seed. The seed is directed to flow out an open bottom end of the housing and into a container for direct transfer to a seed distribution vehicle. A fourth diverging conical member may be located below the outlet end of the third conical member in the housing.

18 Claims, 4 Drawing Sheets

APPARATUS AND METHOD FOR TREATING SEED

RELATED APPLICATIONS

This application is a continuation-in-part of application Ser. No. 08/727,006, filed Oct. 8, 1996.

BACKGROUND OF THE INVENTION

1. Field of the Invention

The present invention is generally directed to an apparatus for use in treating germinated seed prior to planting the seed, as well as a method of treating such seed.

2. Discussion of Related Art

It is known to spread seed, particularly agricultural seed, through the use of both land and aerial seed spreaders. Regardless of the particular manner of spreading the seed, it has heretofore been proposed to treat the seed with insecticides, fungicides and the like prior to spreading thereof to enhance the effectiveness of the seeding. Such treating can be performed upon dry or pre-soaked seed and is generally accomplished by spraying a treating liquid directly on the seed. Previous seed treating apparatus and methods have only been used to treat dry seed, prior to soaking, which encourages pre-germination and seed sprout or radicle emergence from the seed coat.

When treating seed, it is important to treat all the seed uniformly. In other words, it is important that substantially all of the seeds be treated as equally as possible. Therefore, any apparatus for treating seed must be adjustable to accommodate varying types and flow rates of seeds to assure correct treatment of the seed.

Known seed treating apparatus fail to provide a way of treating pre-soaked, pre-germinated seeds without causing damage to the seed germ and/or radicle that emerges from the seed coat. Therefore, there exists a need in the art for a seed treating apparatus, as well as a method of treating seed, which overcomes these and other drawbacks associated with the prior art.

SUMMARY OF THE INVENTION

It is therefore an object of the present invention to provide seed treating apparatus without damaging the seed.

It is a further object of the present invention to provide a seed treating apparatus which allows large quantities of seed to be treated rapidly and uniformly.

It is a still further object of the present invention to provide a self-contained system to reduce worker exposure to pesticide spray.

In accordance with the present invention, seed is gravity fed through a portable treating apparatus including a housing within which are mounted at least three vertically spaced conical members and a plurality of sprayer units. The upper one or first of the conical members is convergent in a downward direction and guides the seed within an upper, open end of the housing towards a central, restricted opening or outlet at its lower end. A second downwardly diverging conical member is spaced below the lower end of the upper conical member, so that the falling seed flows through the restricted opening of the first conical member and over the diverging surface of the second conical member as it travels downwardly through the housing.

In a preferred embodiment, the second conical member can be vertically shifted to adjust the effective open area of the restricted opening of the first conical member so that the rate at which the seed flows through the restricted opening of the first conical member can be adjusted. This vertical adjustment may be performed by attaching the second conical member to a threaded element that, in turn, is threadably attached to a vertically mounted threaded shaft extending through the first conical member. Rotation of the vertical shaft or threaded element moves the second conical member upwardly or downwardly relative to the first conical member, thereby changing the effective size of the restricted opening through which the seed falls, and thereby controlling the flow of seed through the opening. Thus, the rate of seed flow can be varied by providing a mechanism for altering the effective open area of the restricted lower opening of the first conical member. Other arrangements may be used for adjusting the rate of flow of seed through the outlet opening of the first conical member.

A first set of spraying nozzles is spaced about the inner periphery of the housing above the second conical member and is preferably aimed at an approximately forty-five degree downward angle toward the second conical member for spraying liquid treating agent onto the seed as it passes downwardly through the lower restricted opening of the first conical member and while it is approaching and flowing over the second conical member. The seed then drops toward a third downwardly converging conical member which guides the seed to a lower, restricted open end of the third conical member. A second set of spraying nozzles is provided between the second and third conical members to spray the falling seed a second time while it is falling toward and over the third conical member.

With this arrangement, a supply of seed can be delivered to the open top end of the first conical member at the top of the housing and guided by the three conical members while the seeds are effectively coated with liquid treating agent. The rate of seed flow flowing through the first conical member can be adjusted as needed.

A fourth downwardly diverging conical member preferably is provided at the lower end of the housing below the open lower end of the third conical member. The fourth conical member, like the second conical member, has an upper end portion of reduced diameter relative to its lower portion, and the falling seed flows over the diverging surface of the fourth conical member to further agitate and comingle the coated seed.

The entire seed treating apparatus is preferably mounted upon a mobile carriage such as a wheeled trailer, which also carries a pump, reservoir, and other operating elements for enabling operation of the apparatus. When the fully treated seed leaves the housing, it may be directly bagged for delivery to a land or aerial seed spreader used for distributing the seed over a planting area.

BRIEF DESCRIPTION OF THE DRAWINGS

Additional features and advantages of the invention will become more readily apparent from the following detailed description thereof when taken in conjunction with the drawings wherein like reference numerals refer to corresponding parts in the several views.

DETAILED DESCRIPTION OF THE PREFERRED EMBODIMENT

Figures 1, 11:
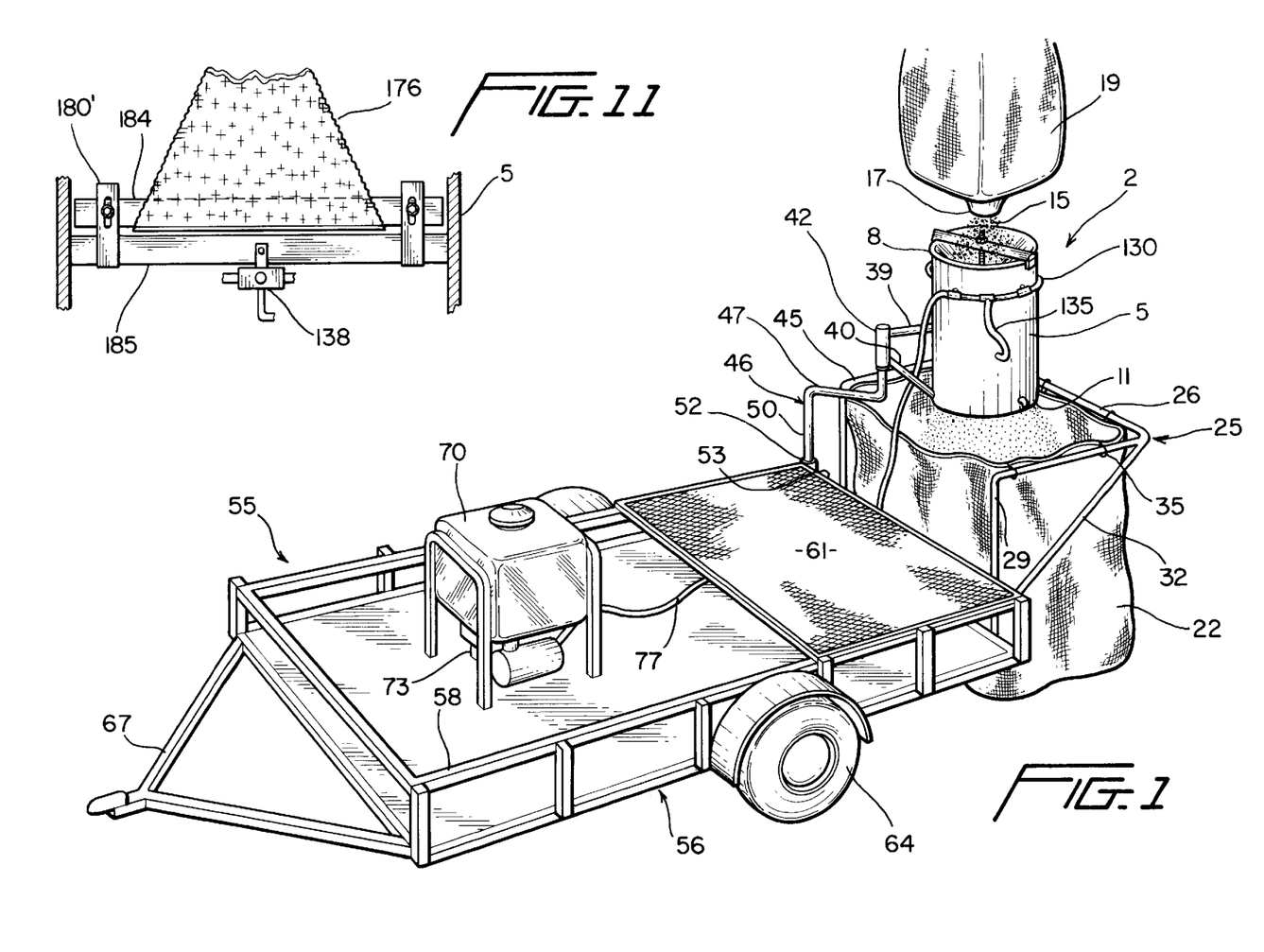
FIG. 1 is a perspective view of the seed treating apparatus in accordance with the invention mounted upon a mobile transporting vehicle.
FIG. 11 shows an alternate embodiment of the invention.

With initial reference to FIG. 1, the seed treating apparatus of the invention is generally indicated at 2 and comprises an outer, usually vertically oriented in use, tubular housing 5, preferably cylindrical in shape, having an upper open end 8 and a lower open end 11. Housing 5 is adapted to receive seed 15 shown flowing from a lower opening 17 of a transport bag 19 supported above housing 5 by any suitable means. As will be discussed more fully herein, seed 15 is treated within housing 5 by coating it with an insecticide, fungicide or the like in liquid form and then is delivered through lower open end 11 into a sack 22 that is supported by a frame 25. As shown, frame 25 includes a generally U-shaped support bar 26 having bent ends which defined upright support members 29. Additional diagonal support members 32 are preferably provided for bracing purposes. Sack 22 can be removably attached to frame 25 during filling thereof by various known types of retainers such hooks 35. Once filled, sack 22 can be directly transported to either a ground or aerial seed distribution vehicle (not shown) for spreading of the treated seed 15. Alternatively, the support bar 26 may be formed as two laterally spaced parallel support bars on either side of the location of sack 22 without a horizontally extending bar connecting the laterally spaced bars. The diagonal support members 32 and upright support member 29 would be provided with the laterally spaced horizontal bars in accordance with this alternate embodiment.

As shown in this figure, housing 5 has secured thereto a pair of vertically spaced mounting arms 39 and 40. Mounting arms 39 and 40 are preferably made of metal and are also fixedly secured, such as by welding, to a sleeve 42. Sleeve 42 is rotatably received upon an upright shaft portion 45 of a support bar 46. Support bar 46 also includes a cross bar portion 47 and a second, upright shaft portion 50. Second upright shaft portion 50 is rotatably received within a tubular mount 52 affixed to a rear end 53 of a trailer wheeled vehicle 55. In the embodiment shown, trailer 55 generally includes a frame 56, a lower bed 58, an upper bed 61, wheels 64 and a forward tow bar 67. Trailer 55 is illustrated to indicate that seed treating apparatus 2 is preferably mounted upon a mobile vehicle such that it can be readily transported. Therefore, trailer 55 should only be considered to be an exemplary type of vehicle and seed treating apparatus 2 can equally be mounted on other types of mobile vehicles or can be mounted at a stationary treating location. In any case, seed treating apparatus 2 further includes a liquid treating agent supply tank 70, as well as a pump 73 for delivering a treating liquid from tank 70 to the interior of housing 5 through a supply conduit or line 77 in a manner which will be more fully described below.

Figure 2:
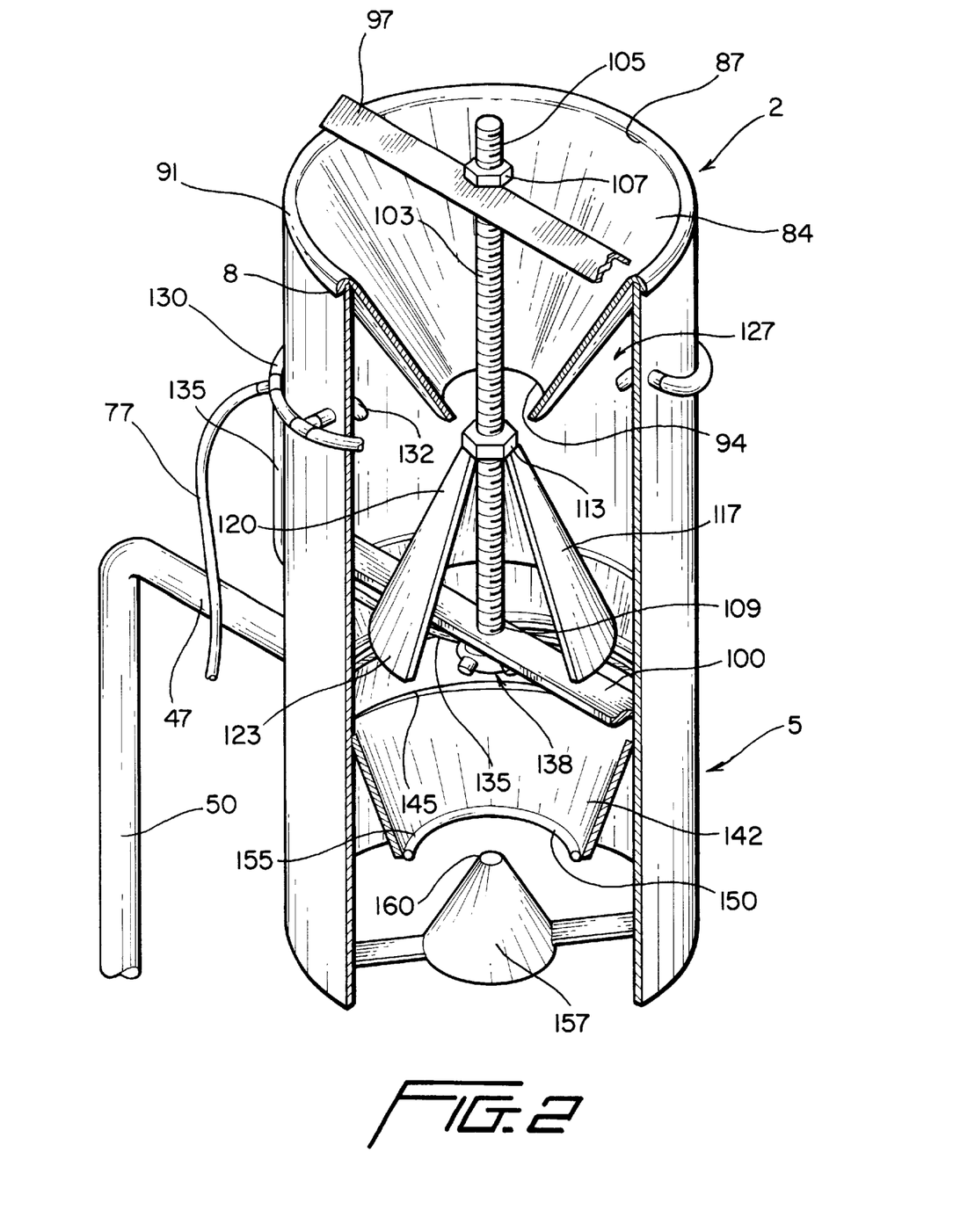
FIG. 2 is a partial cross-sectional elevational and perspective view of the seed treating apparatus of FIG. 1.
Figure 3:
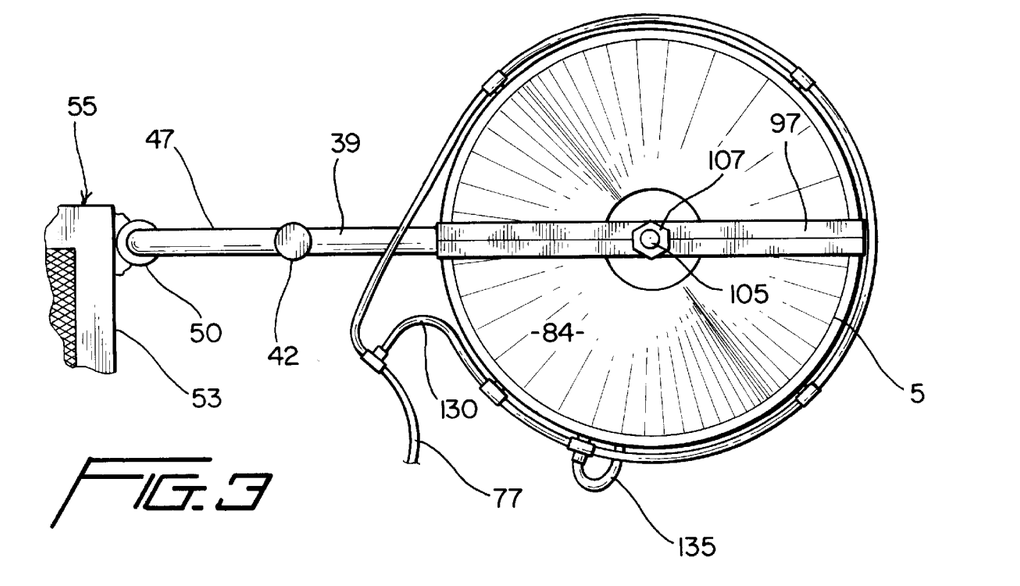
FIG. 3 is a top view of the seed treating apparatus of FIG. 2.
Figure 4:
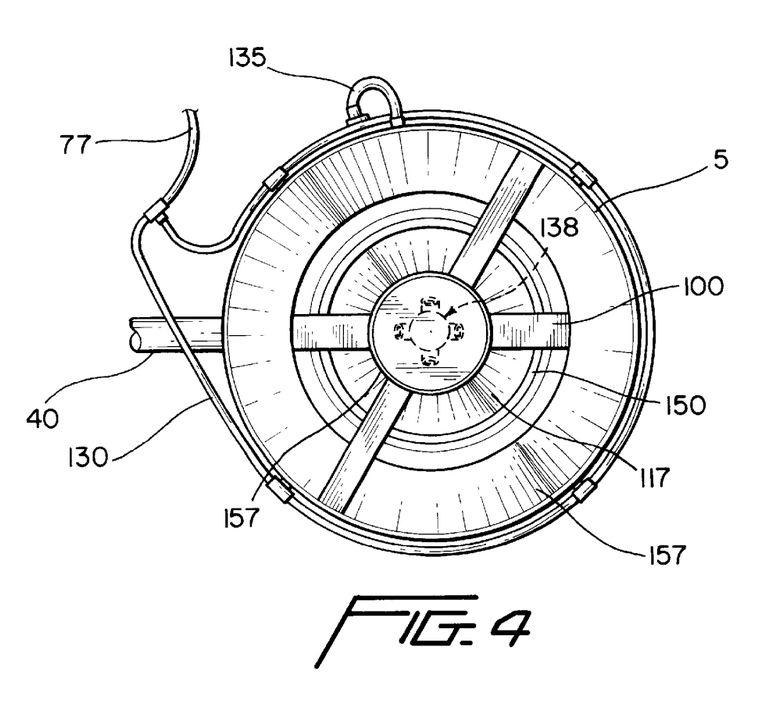
FIG. 4 is a bottom view of the seed treating apparatus of FIG. 2.

Reference will now be made to FIGS. 2–4 in describing additional details of seed treating apparatus 2. A first downwardly converging conical member 84 having a first, open diametric end 87 defined by an upper edge 91 and a second, open reduced-diametric end 94 is positioned within housing 5 with upper edge 91 extending about first or upper open end 8 of housing 5. In a further aspect of the present invention, a cylindrical band or ring may be fastened about upper edge 91 to prevent spillage of the seed (see FIG. 5). In such an arrangement the cone is fastened to the cylinder by way of straps to fix the cone 84 in position as will be described below with reference to FIG. 5.

A first cross-bar 97 extends diametrically across upper edge 91 of first conical member 84. A second cross-bar 100 is affixed to housing 5 at a position vertically spaced below first conical member 84. A threaded rod 103 includes an upper end 105 that extends through a central portion of first cross-bar 97 and has a nut 107 threadably attached thereto. Lower end 109 of threaded rod 103 is similarly affixed to second cross-bar 100. A central nut 113 is threadably attached to rod 103 and has affixed thereto a second conical member 117.

More specifically, a second, downwardly diverging conical member 117 includes an upper narrow end portion 120 that is fixedly secured for rotation with central nut 113 and a larger lower end portion 123. With this arrangement, second conical member 117 can be vertically shifted relative to first conical member 84 by manual rotation of nut 113 relative to shaft 103 for reasons which will be more fully described below. At this point, it should be noted, however, that upper end portion 120 of second conical member 117 is smaller in diameter than second, open reduced-diametric end 94 of first conical member 84 such that second conical member 117 can be shifted vertically to alter the effective size of the open area of end 94 of first conical member 84.

A first set of liquid treating agent sprayer units 127 including nozzles 132 is arranged about the inner periphery of housing 5. More specifically, supply line 77 leads to a manifold line 130 which, in turn, is open to a plurality of spray nozzles 132 extending within housing 5. In the preferred embodiment shown, nozzles 132 are located above second conical member 117 and are angled downward toward second conical member 117 at an angle of approximately forty-five degrees. Stemming from manifold line 130 is a branch line 135 that leads to a second set of sprayer nozzles 138 affixed below second cross-bar 100 secured to the housing. The second set of sprayer nozzles 138 are preferably located above the third conical member 142 and are angled toward the inner side of a third conical member 142. Third conical member 142 includes an open upper end 145 that preferably is affixed, such as by welding, to an inner surface 148 of housing 5.

Third conical member 142 includes a smaller lower open end 150 that is spaced radially inwardly of inner surface 148 of housing 5. If desired, an annular ring 155 (only portions of which are shown in FIG. 2 for clarity of the drawing) may be affixed to third conical member 142 adjacent lower open end 150. A fourth downwardly diverging conical member 157 is fixedly located below the open lower end of the third conical member 142. Thus, fourth conical member 157 is arranged with its reduced diameter end 160 closed and protruding upwardly toward the lower opening of third conical member 142, but spaced therefrom so as not to impede the flow of falling, coated seed.

With the structure described above, seed 15 to be coated with a treating agent can be delivered into first conical member 84 while pump 73 provides a flow of treating liquid from tank 70 to the first and second sets of sprayer units 127 and 138 by means of supply line 77, manifold line 130 and branch line 135. The vertical positioning of second conical member 117 in the embodiment of FIG. 1 will govern the flow rate of seed 15 through first conical member 84. As seed 15 approaches and flows along the surface of second conical member 117, it will be coated by treating liquid sprayed from the nozzles 132. The coated seed 15 then flows downwardly toward the inner surface of the third conical member 142 and is caused to flow downwardly in the conical member 142 towards and out of the lower opening 150. While traversing the zone between the second and third conical members and while flowing downwardly inside the third conical member, the seed is again subjected to sprayed treating material discharged from second set of nozzles 138. It has been found that the inclusion of both the first and second sprayer nozzles 127 and 138 has enabled seed treating apparatus 2 to effectively treat substantially the entire flow of seed 15 given the maximum flow rate permissible through first conical member 84. The tumbling and agitating action of the conical members enhances the coating activity and insures a complete, uniform coating of the seeds.

In a still further embodiment of the present invention, a sensor to be described below with reference to FIG. 5 may be provided below the second, open reduced diametric end 94 of the first conical member 84. If provided, such a sensor will be connected to an electrical switch or microswitch and will detect the flow of seed 15 through the second, open reduced diametric end 94. The switch is electrically connected to a controller for the pump 73 by appropriate connecting means to automatically regulate the flow of treating fluid through the first and second sets of sprayer nozzles 127 and 138. The sensor also could be a photoelectric unit which would detect the change in light when the seed 15 flows through the second, open reduced diametric end 94. This automatic pump control arrangement offers the advantage of minimizing the amount of liquid needed to treat the seed, thereby reducing exposure of an operator of the machine to the treating material, and reducing the cost of treating the seed.

The second and third conical members, as well as the fourth conical member where used, may be made from metal or plastics materials. They may be all constructed of the same material or each of different materials. The conical members may also be provided with raised outer surfaces, such as tread plate or anti-skid plate material. This provides the advantage that tumbling and mixing of the seed will be improved, and also adhesion of moist seeds to the outer surfaces of the conical members will be reduced or avoided.

The various conical members preferably will be constructed with conical angles generally not less than 45 degrees, although the amount of the angle may vary according to the type of seed used, the moisture content of the seed, and the flow rate of the seed through the apparatus.

Preferably, nozzles 132 distribute the treating agent inwardly in a conical spray pattern that effectively contacts the seed flowing through the lower open end 94 of first conical member 84 from the outside in, while the second set of nozzles 138 sprays a flat fan pattern of liquid outwardly into the falling seed from the inside out as it approaches the inside surface of the third conical member 142. The combination of this spraying and the tumbling of the seed over the conical surfaces results in a uniform application of treating agent to the surfaces of all of the seed flowing through the housing 5. Exemplary spray nozzles useful for spray nozzles 132 (upper set) are made by Spraying Systems Company of Wheaton, Ill., type CONEJET™ Hollow Cone Spray Tips, model TX-VS12, and for the nozzles 138 (lower set) TEE JET™ Flat Spray Tips, model 11003 made by the same manufacturer.

Figures 5, 6, 7, 8, 9, 10:
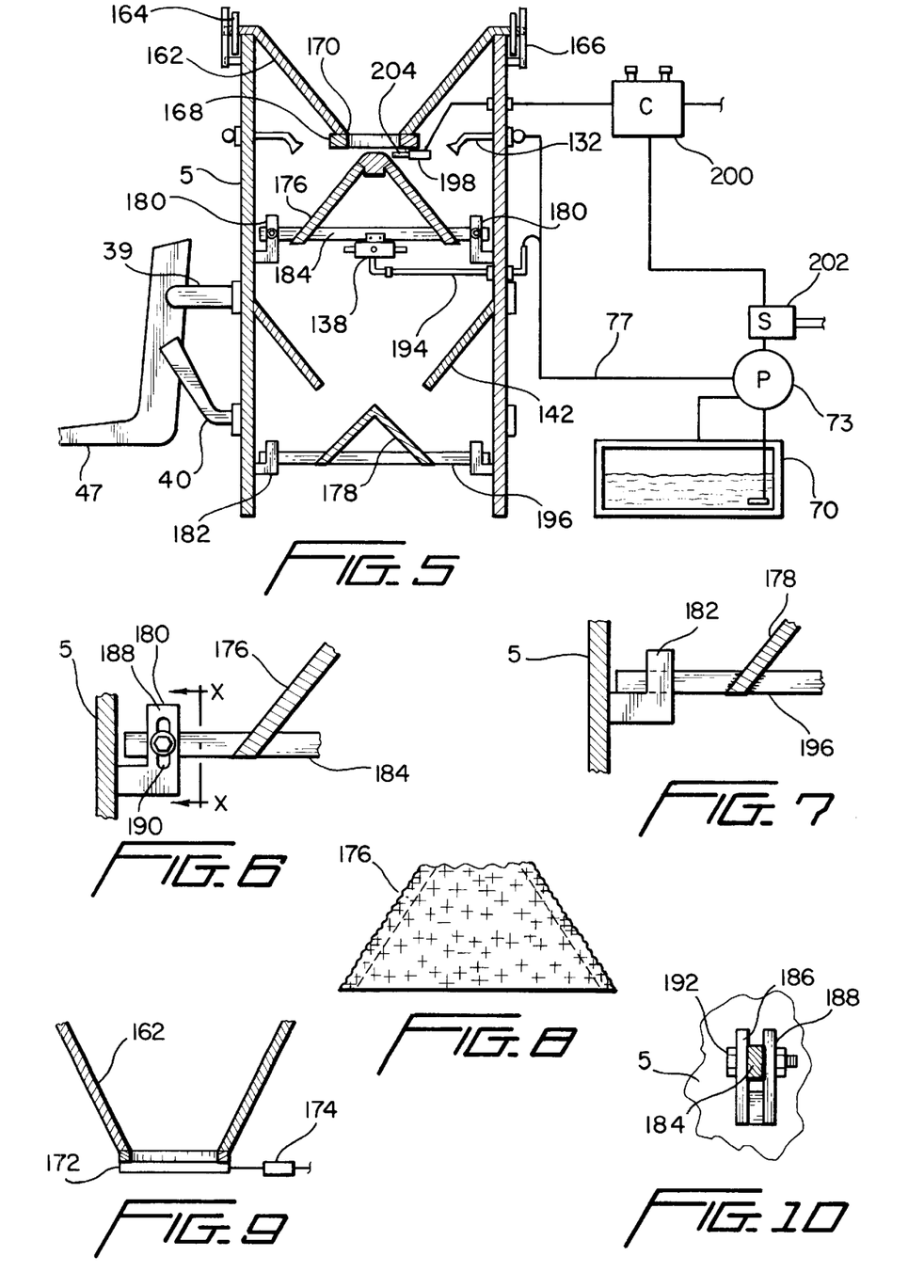
FIG. 5 shows a side elevational cross-section view of another embodiment of the seed treating apparatus in accordance with the invention.
FIGS. 6 and 7 show details of mounting brackets for securing the conical elements to the housing of the seed treating apparatus.
FIG. 8 shows a tread plate material used to form a conical member.
FIG. 9 schematically illustrates a variable size restricted opening for a first conical member used in the seed treating apparatus.
FIG. 10 is a view taken along line X—X of FIG. 6.

With reference to FIG. 5, an alternate embodiment of the invention is illustrated. In accordance with the embodiment of FIG. 5, housing 5 basically corresponds with the housing 5 illustrated in FIGS. 1–4 as described above. However, first conical member 162 includes an upwardly extending flange 164 that overlies the upper rim of the housing 5 and extends upwardly therefrom to provide a guard against spillage of seed over the rim of the housing 5. Manually operable clamps 166 enable quick release of the first conical member 162 from the rim of housing 5 to provide access to the interior of the housing. The clamps 166 may include spring or resilient elements to resiliently bias the upper rim area of the first conical member 162 downwardly against the top rim of the housing 5.

The first conical member 162 includes a calibrated outlet orifice 168 welded or otherwise secured to the outlet end 170 of the conical member 162 to form the lower outlet of the conical member 162. The calibrated orifice may be variable by securing the orifice to the outlet 170 by a removable fastener or otherwise may include a device for varying the cross-sectional area of the outlet opening of the first conical member 162, for example as illustrated in FIG. 9.

In FIG. 9, conical member 162 is provided with a variable orifice 172 that may comprise a suitable variable type diaphragm opening or other system that enables adjustment of the effective cross-sectional area of the opening at the bottom end of the first conical member 162. For example, a control motor 174 controllable by a manual device or a suitable electronic or electrical device may be provided to operate the variable orifice 172 to control the flow area at the bottom of the first conical member 162.

In accordance with the embodiment of FIG. 5, the second and fourth conical members 176, 178, respectively, are retained in housing 5 by support brackets 180, 182 illustrated in FIGS. 6, 7 and 10. The second conical element 176 is provided with a generally horizontal support bar 184 that has a length corresponding substantially to the interior diameter of the housing 5 and on which the second conical member 176 is securely fastened such as, for example, by welding. While the support bar 184 is shown as extending completely across the base of the second conical member 176, it is to be understood that the support bar 184 may extend radially from opposite sides only of the outer periphery of the lower portion of the second conical member 176.

As shown in FIG. 6, the outer ends of the support bar 184 extend into support brackets 180 firmly fixed to the interior of the housing 5 such as by welding. The brackets 180, as seen in FIG. 10, are bifurcated and include an inner upwardly opening slot 186 having a closed bottom into which the bar 184 extends. The sidewall portions 188 of each bracket 180 are vertically slotted as shown at 190 and a bolt 192 and an associated nut fastener at its opposite end extend through the slot 190 and at the same time extend through the end of the bar 184 laying in the slot 186. Tightening of the bolt 192 firmly locks the bar 184 in housing 5, but the position of the bar 184 and therefore the position of the second conical member 176 may be vertically adjusted by loosening the bolt 192 and sliding the bar 184 vertically relative to bracket 188 via slot 190. Accordingly, the flow area of the orifice 168 associated with first conical member 162 may be varied by vertically adjusting the position of the bar 184 in the brackets 180 to adjust the position of the second conical member relative to the orifice 168.

Removal of the bolts 192 permits quick removal of the second conical member 176 upwardly through the top of the housing 5 after the first conical member 162 has been removed from the top area of the housing. Such a removal system avoids the need for an operator to release the second conical member 176 from the below the housing 5, which quite often is a difficult task at best and subjects an operator to residual treating agent in the lower end of the housing 5.

In accordance with the embodiment of FIG. 5, the second set of nozzles 138 is supported on the bar 184 to permit ready removal of the second set of nozzles 138 from the housing 5 when the second conical member 176 is raised from brackets 180. A flexible conduit 194 is provided to connect the nozzles 138 to conduit 77 that delivers treating agent from the tank 70 when pump 73 is operational. Conduit 194 may be secured to the bottom of the bar 184 in a practical embodiment and appropriate connectors are utilized to permit ready assembly and disassembly of the conduit 194 from the supply conduit 77.

A preferred embodiment of the support arrangement for the conical member 176 is illustrated in FIG. 11, wherein support bar 184 is mounted in brackets 180' that are in turn secured to a second support bar 185 that is rigidly attached to the housing 5 at its opposed ends. In accordance with this embodiment, support bar 184 and conical member 176 may be removed from the housing 5 by lifting same from the brackets 180' while leaving second support bar 185 in place with the associated sprayer nozzles 138. This arrangement eliminates the need to disconnect the sprayer nozzles 138 from the conduit 194 when conical member 176 is lifted from the housing 5. This arrangement also avoids movement of the nozzles 138 when the position of conical member 176 is vertically adjusted in housing 5.

The fourth conical member 178 is also secured to the interior of the housing 5 by brackets 182 firmly secured to the inner periphery of the housing 5. The brackets 182, like brackets 180, are bifocated at their upper ends to provide an upwardly opening slot to receive the ends of the support bar 196 secured to and extending along the bottom side of fourth conical member 178. While the support bar 196 is illustrated as spanning the entire bottom side of the fourth conical member 178, it should be is understood that the bar 196 may be connected rigidly to the bottom end area of the fourth conical member 178 without spanning the entire bottom of the conical member.

If desired, the arrangement of support bar 196 and brackets 182 may be configured like the embodiment illustrated in FIG. 11, where the brackets 182 would be mounted on a continuous secondary support bar located below support bar 196 connected to conical member 178.

The use of the bar 196 and the brackets 182 enables quick assembly and disassembly of the fourth conical member 178 downwardly into and upwardly away from the brackets 182 which enables the conical member 178 to be tilted and assembled and removed through the bottom of the housing 5. If desired, a simple fastener may be utilized with brackets 182 to secure the bar 196 in the bracket 182.

In accordance with the embodiment of FIG. 5, flow of treating agent may be automatically actuated upon flow of seed through the first conical member 162 by providing a seed flow sensor 198 that extends into the flow path of seed dropping through the orifice 168 and provides an output signal to a solenoid switch 202 via controller 200 that enables flow of treating agent from continuously running pump 73. The controller 200 may include suitable controls to enable manual operation of the pump 73 or automatic operation of the pump under the control of the seed sensor 198. The seed sensor 198, for example, may include a microswitch (not illustrated) actuatable by a spring finger 204 extending into the path of dropping seed discharged from the bottom of the first conical member 162.

The outer surfaces of the second and fourth conical members 176, 178, may be rough or textured as illustrated in FIG. 8, where second conical member 176 is shown as having a tread plate configuration on its outer surface. Such surface roughness has been found to prevent sticking of coated seed to the surfaces of the second and fourth conical members and to promote tumbling of the seed.

Although described with respect to a preferred embodiment of the invention, it should be readily understood that various changes and/or modifications made be made to the invention without departing from the spirit thereof. In general, it should be readily apparent that the seed treating apparatus 2 provides a simple and effective seed treating arrangement and, given the ability of the seed to be readily spread from sack 22, reduces the costs associated with the treating and distribution of the seed. In addition, the mounting of the seed treating apparatus 2 upon trailer 55 or other mobile vehicles enables apparatus 2 to be readily transported for use at various sites. To enhance this portability, pump 73 can be replaced by a pressurized tank in accordance with the invention. In any event, the invention is only intended to be limited by the scope of the following claims, and not by the illustrative examples described herein.

We claim:

1. A method of treating seed with a liquid seed treating agent by coating the seed with the agent, comprising the steps of:

providing a vertical tubular housing containing at least three vertically spaced, alternating downwardly converging and downwardly diverging conical surfaces and a pair of vertically spaced liquid spray nozzle sets located at at least two spray areas, each of which spray areas is located between two vertically spaced conical surfaces; and causing a volume of seed to be treated to continuously flow downwardly through the housing and over the successive conical surfaces beginning with an inwardly converging conical surface while spraying the seed with liquid seed treating agent via the spray nozzles at said spray areas, including discharging the spray from the upper nozzle set inwardly in a conical spray pattern toward the central area of the housing while the seed is approaching and traversing a diverging conical surface and from the lower nozzle set outwardly in a fan spray pattern toward the interior housing wall while the seed is approaching and traversing a converging conical surface.

2. A method according to claim 1 including using a fourth conical surface below a third conical surface in the series of vertically spaced, alternating downwardly converging and downwardly diverging conical surfaces.

3. An apparatus for treating seed with a liquid seed treating agent comprising:

an outer tubular housing having first and second vertically spaced open end portions;

a first, downwardly converging conical member having an upper open inlet end and a lower open reduced diameter outlet end, said first conical member being

9 mounted on said housing with the upper end thereof located adjacent the first end portion of said housing and the lower end of the first conical member extending into said housing toward said second open end portion;

a second, downwardly diverging conical member including an upper end portion that has a diameter that is less than that of the lower outlet end of said first conical member and a lower end portion having a diameter that is greater than the diameter of the upper end portion;

means for mounting said second conical member in said tubular housing below said first conical member with the upper end thereof facing the outlet end of the first conical member;

a first set of spraying units mounted within said housing and including nozzles oriented for directing sprays of liquid seed treating agent radially inwardly into an area within the housing between the outlet end of said first conical member and the lower end portion of said second conical member;

a third downwardly converging conical member in the housing and including an open upper end extending along the inner peripheral surface of said housing, said third conical member having a lower outlet end smaller in area than the upper outlet end thereof;

a second set of spraying units mounted within said tubular housing, said second set of spraying units including nozzles oriented to discharge sprays of liquid seed treating agent radially outwardly into the interior of the housing between the lower end portion of the second conical member and the lower outlet end of the third conical member;

conduits arranged to supply liquid seed treating agent to said nozzle units and a vertical position adjusting mechanism supporting the second conical member for vertical movement within the housing to adjust the relative position of the upper end of the second conical member relative to the lower outlet end of the first conical member, to thereby enable adjustment of the flow volume through the first conical member outlet end, said position adjusting mechanism including a mechanism selected from the group consisting of a vertical threaded rod supported centrally within the housing on which said second conical member is mounted by a threaded connector, rotation of which threaded connector relative to the rod producing vertical motion of the second conical member in the housing, and a vertically adjustable connector connecting the second conical member to the housing.

4. Apparatus according to claim 3, wherein said vertically adjustable connector comprises a plurality of brackets each having a vertically extending and upwardly opening slot therein and secured to the housing interior transversely spaced from the second conical member; and at least one horizontal support bar secured to the second conical member and having ends extending transversely into the slots of said brackets.

5. Apparatus according to claim 4, said brackets each including an elongated vertical slot co-extending with said upwardly opening slot;

said ends of said support bar secured to said brackets by a releasable fastener extending through said elongated slot, whereby releasing and securing the fastener permits adjustment of the support bar vertically along the slot.

6. Apparatus according to claim 3, said first nozzle unit including conical spray pattern discharge nozzles.

7. Apparatus according to claim 6, said second nozzle unit including flat fan spray pattern discharge nozzles.

8. Apparatus according to claim 3, said nozzles of said first nozzle unit disposed radially outwardly from the lower end of the first conical member and aimed approximately 45 degrees downwardly towards an outer diverging surface of the second conical member.

9. Apparatus according to claim 8, said nozzles of said second nozzle unit located centrally in the housing and aimed radially outwardly.

10. Apparatus according to claim 9, said nozzles of said first nozzle unit arranged to discharge a conical spray pattern and said nozzles of said second nozzle unit arranged to discharge a flat fan spray pattern.

11. Apparatus according to claim 10, including a fourth, downwardly diverging conical member below the outlet end of the third conical member, said fourth conical member having a smaller upper end extending adjacent the lower outlet end of the third conical member and a larger lower end disposed adjacent the second end portion of the housing.

12. Apparatus according to claim 3, including a fourth, downwardly diverging conical member below the outlet end of the third conical member, said fourth conical member having a smaller upper end extending adjacent the lower outlet end of the third conical member and a larger lower end disposed adjacent the second end portion of the housing.

13. Apparatus according to claim 12, said third and fourth conical members having a non-smooth outer diverging surface for preventing sticking of flowing seed thereto.

14. Apparatus according to claim 1, said second conical member having a non-smooth outer diverging surface for preventing sticking of flowing seed thereto.

15. Apparatus according to claim 3, including a wheeled transport vehicle having a support for securing the housing at an elevated position above a surface supporting the wheels of the vehicle;

said means for supplying said treating agent to the nozzles including at least a supply tank for liquid seed treating agent, a pump and conduit connecting the pump to the tank and the nozzles; and said vehicle having a support for at least said tank and pump.

16. An apparatus for treating seed with a liquid seed treating agent comprising:

an outer tubular housing having first and second vertically spaced open end portions;

a first, downwardly converging conical member having an upper open inlet end and a lower open reduced diameter outlet end, said first conical member being mounted on said housing with the upper end thereof located adjacent the first end portion of said housing and the lower end of the first conical member extending into said housing toward said second open end portion;

a second, downwardly diverging conical member including an upper end portion that has a diameter that is less than that of the lower outlet end of said first conical member and a lower end portion having a diameter that is greater than the diameter of the upper end portion;

means for mounting said second conical member in said tubular housing below said first conical member with the upper end thereof facing the outlet end of the first conical member;

a first set of spraying units mounted within said housing and including nozzles oriented for directing sprays of liquid seed treating agent radially inwardly into an area within the housing between the outlet end of said first conical member and the lower end portion of said second conical member;

a third downwardly converging conical member in the housing and including an open upper end extending along the inner peripheral surface of said housing, said third conical member having a lower outlet end smaller in area than the upper outlet end thereof;

a second set of spraying units mounted within said tubular housing, said second set of spraying units including nozzles oriented to discharge sprays of liquid seed treating agent radially outwardly into the interior of the housing between the lower end portion of the second conical member and the lower outlet end of the third conical member;

conduits arranged to supply liquid seed treating agent to said nozzle unit; and wherein said outlet end of said first conical member is variable.

17. An apparatus for treating seed with a liquid seed treating agent comprising:

an outer tubular housing having first and second vertically spaced open end portions;

a first, downwardly converging conical member having an upper open inlet end and a lower open reduced diameter outlet end, said first conical member being mounted on said housing with the upper end thereof located adjacent the first end portion of said housing and the lower end of the first conical member extending into said housing toward said second open end portion;

a second, downwardly diverging conical member including an upper end portion that has a diameter that is less than that of the lower outlet end of said first conical member and a lower end portion having a diameter that is greater than the diameter of the upper end portion;

means for mounting said second conical member in said tubular housing below said first conical member with the upper end thereof facing the outlet end of the first conical member;

a first set of spraying units mounted within said housing and including nozzles oriented for directing sprays of liquid seed treating agent radially inwardly into an area within the housing between the outlet end of said first conical member and the lower end portion of said second conical member;

a third downwardly converging conical member in the housing and including an open upper end extending along the inner peripheral surface of said housing, said third conical member having a lower outlet end smaller in area than the upper outlet end thereof;

a second set of spraying units mounted within said tubular housing, said second set of spraying units including nozzles oriented to discharge sprays of liquid seed treating agent radially outwardly into the interior of the housing between the lower end portion of the second conical member and the lower outlet end of the third conical member;

conduits arranged to supply liquid seed treating agent to said nozzle units, said first conical member including a calibrated orifice at its outlet end.

18. An apparatus for treating seed with a liquid seed treating agent comprising:

an outer tubular housing having first and second vertically spaced open end portions;

a first, downwardly converging conical member having an upper open inlet end and a lower open reduced diameter outlet end, said first conical member being mounted on said housing with the upper end thereof located adjacent the first end portion of said housing and the lower end of the first conical member extending into said housing toward said second open end portion;

a second, downwardly diverging conical member including an upper end portion that has a diameter that is less than that of the lower outlet end of said first conical member and a lower end portion having a diameter that is greater than the diameter of the upper end portion;

means for mounting said second conical member in said tubular housing below said first conical member with the upper end thereof facing the outlet end of the first conical member;

a first set of spraying units mounted within said housing and including nozzles oriented for directing sprays of liquid seed treating agent radially inwardly into an area within the housing between the outlet end of said first conical member and the lower end portion of said second conical member;

a third downwardly converging conical member in the housing and including an open upper end extending along the inner peripheral surface of said housing, said third conical member having a lower outlet end smaller in area than the upper outlet end thereof;

a second set of spraying units mounted within said tubular housing, said second set of spraying units including nozzles oriented to discharge sprays of liquid seed treating agent radially outwardly into the interior of the housing between the lower end portion of the second conical member and the lower outlet end of the third conical member; and conduits arranged to supply liquid seed treating agent to said nozzle units, said means for supplying liquid seed treating agent including a pump; and means for controlling energization of the pump including a seed flow sensor for detecting flow of seed through the housing.

* * * * *